Aug. 15, 1967     W. E. LOWREY     3,335,999
VALVE

Filed May 20, 1964     4 Sheets-Sheet 1

INVENTOR.
WILLIAM E. LOWREY
BY

AGENT

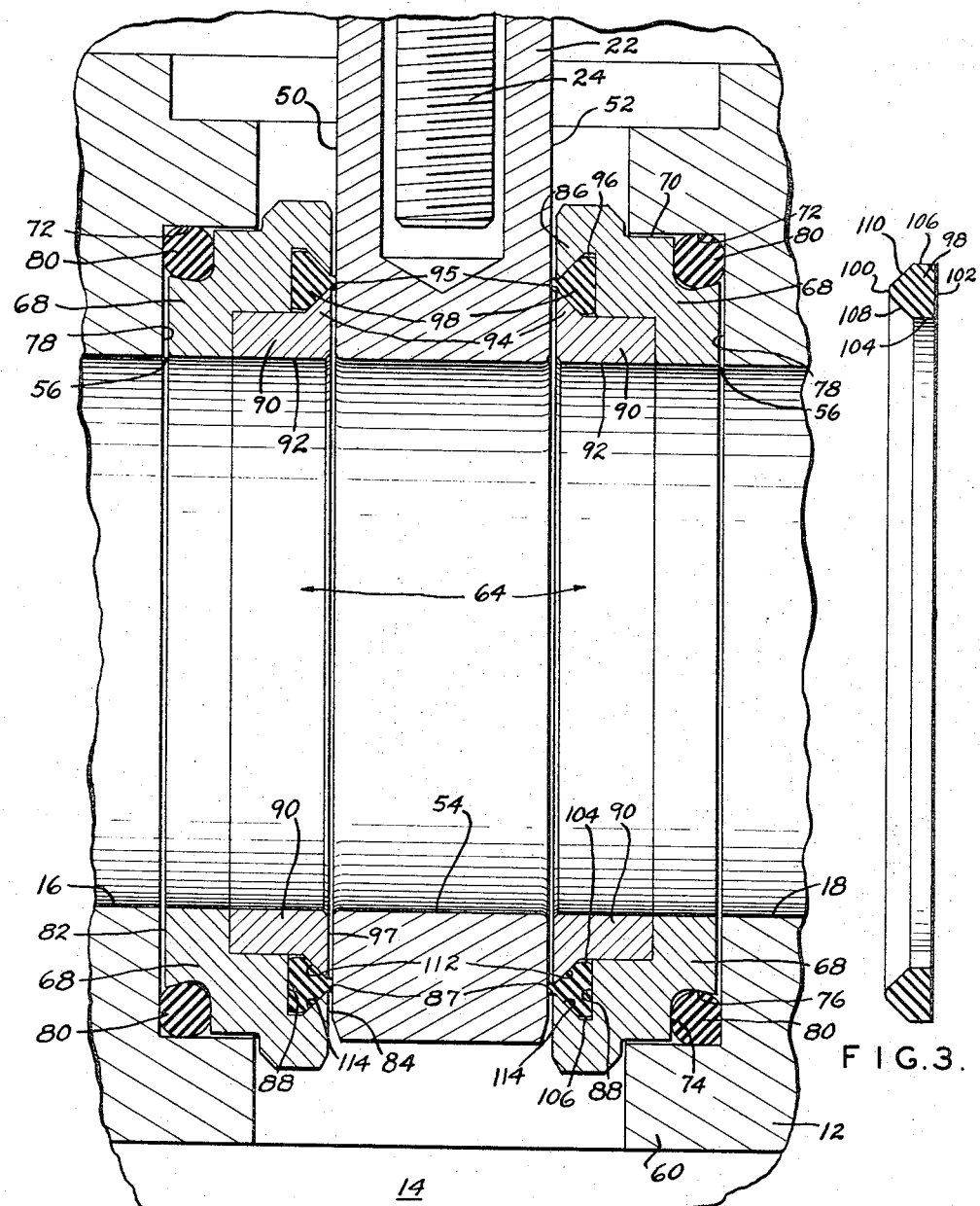

INVENTOR.
WILLIAM E. LOWREY
BY
AGENT

Aug. 15, 1967     W. E. LOWREY     3,335,999

VALVE

Filed May 20, 1964     4 Sheets-Sheet 4

INVENTOR.
WILLIAM E. LOWREY
BY
AGENT

United States Patent Office 3,335,999
Patented Aug. 15, 1967

3,335,999
VALVE
William E. Lowrey, Houston, Tex., assignor to ACF Industries Incorporated, New York, N.Y., a corporation of New Jersey
Filed May 20, 1964, Ser. No. 368,936
8 Claims. (Cl. 251—172)

This invention relates generally to valves for controlling fluid flow and more particularly to valves operating under high pressure conditions and utilizing sealing means incorporating elastomeric material.

Elastomeric materials, such as natural rubber or any one of numerous synthetic rubberlike materials, have historically been considered superior sealing material in most valve applications. Rubber or rubberlike synthetic materials, hereinafter referred to as elastomeric sealing materials, are considered desirable in most noncorrosive valve applications because they are inexpensive to obtain and because they have an inherent ability to conform to most surfaces to produce an effective seal even though the surface may not be exceptionally smooth. When utilizing elastomers for sealing elements in valves, therefore, the machining cost for producing the sealing surfaces of the valve may be kept at a minimum. Since elastomer materials will distort under low pressure and will conform to the sealing surfaces of the valve, an effective seal may be formed even though the line pressure of the valve is very low. Elastomer sealing members, therefore, are inherently adapted for both high and low line pressure operation when properly contained.

Although elastomer materials are superior for their sealing ability at both high and low pressures, a number of serious disadvantages exist which have prohibited the application of unsupported elastomer materials to both high and low pressure conditions which is known in the industry as "full range" valve application. A soft elastomer sealing material provides a better seal than most other sealing materials due to its inherent ability to conform to the sealing surface of the valve, but when utilized in a high pressure system where it must carry very high loads, the elastomer sealing material tends to deform excessively, thus allowing excessive movement of the valve elements in a downstream direction. Excessive valve movement resulting from an overdistortion of the sealing members eliminates the possibility of achieving an upstream seal because the upstream sealing assembly of the valve will not be allowed to travel the distance required to establish a proper seal. Excessive distortion of the sealing members also tends to increase the surface contact area between the sealing member and the moving elements of the valve, thus resulting in high torque required to operate the valve. Under exceptionally high line pressure conditions the surface contact area between the sealing member and the valve element will be great enough to cause the valve parts to lock. This condition is known in the industry as "pressure lock" and positively prevents operation of the valve element. Excessive seat deformation at high line pressures also allows excessive downstream travel of the gate or plug element which imparts severe side thrust loads to the operating stem, thereby producing excessive wear on the stem packing assembly and reducing the ability of the valve seat elements to achieve an upstream seal.

Under high pressure conditions, elastomer sealing members may easily be blown from the seat recess and carried into the downstream line by the lading. The elastomer material, being easily deformed, is highly susceptible to extrusion into a position where it may be engaged and severed or otherwise damaged by the valve member upon its movement between open and closed positions.

In an effort to provide valves which will function at both low and high pressure ranges, the valve industry has recently turned to a number of plastic materials which have recently been developed for use as sealing materials. Among these plastic materials are polytetrafluoroethylene which is sold under the registered trademark "Teflon" by the E. I. du Pont de Nemours & Company, and a fully saturated fluorocarbon copolymer of chlorotrifluoroethylene and vinylidene fluoride, which is manufactured by the Minnesota Mining and Manufacturing Company and sold under the registered trademark "Kel-F." While plastic materials such as those indicated above have been quite satisfactory for high pressure valve applications, they have been generally unsatisfactory in high and low or "full range" pressure applications. Fluorocarbon plastics such as those indicated above are not generally satisfactory for low pressure valve application because the inability of these materials to be deformed under light loads requires that the machining operations for producing the sealing surfaces of the valve be very exacting thus increasing the cost of the valve. The sealing surfaces of a valve would need to be honed to a high polished condition in order to develop an adequate seal at low pressure conditions. The cost of producing such surfaces would be prohibitive. Fluorocarbon plastic materials are also undesirable for combined low and high pressure applications because not only do they fail to conform to the sealing surfaces of the valve at low pressure conditions due to their nonresilience, but if deformed at high line pressures, the plastic material can take a set and will not return to its original shape, thus making a subsequent low pressure seal highly improbable.

In an effort to utilize the superior sealing qualities of elastomer materials and to eliminate the problems which arise due to overdistortion of the elastomer materials in high pressure valve applications, seat assemblies of valves have been developed which are generally composed of metallic substance and which retain or contain an elastomer sealing element in an annular groove formed therein. Overdistortion of the elastomeric sealing member is effectively prevented since the gate loads are carried by the metallic seat assemblies. Contained elastomer type seat assemblies have been developed which include inner and outer interlocking seat rings formed of metallic substance fitted together to define an annular groove for retaining an O-ring type elastomer sealing member. The outer portions of the groove are generally restricted by annular lip members formed respectively on the inner and outer ring members and which lips are radially spaced considerably less than the cross sectional diameter of the O-ring. A portion of the elastomer O-ring member generally extends through the space between the lip members and into engagement with the working surface of the valve member to establish a seal therewith. The depth of the groove is generally less than the cross sectional diameter of the O-ring sealing member whereby the outer surface of the sealing member is urged between the lip portions and into sealing engagement with the working surface of the valve member. The radial dimension of the groove is generally considerably larger than the cross sectional diameter of the sealing member whereby the sealing member may be completely displaced within the groove by the valve members or by the pressurized lading upon application of high pressure to the valve. While contained O-ring type elastomer seat arrangements are generally satisfactory under moderate pressure conditions serious disadvantages occur under higher pressure conditions which makes their work questionable. Even though the lip portions of the seat member tend to retain the O-ring sealing element within the groove at high pressure conditions, especially during opening and closing of the valve, the O-ring sealing member will be extruded or blown by the extreme turbulence caused by opening or closing the valve into a position where it will be engaged and severed or otherwise damaged by the valve member as the edge of the valve bore moves past the sealing member. At extremely high line pressure conditions the sealing member may be readily blown from its contained seat or containing groove and will be carried downstream by the lading or will remain trapped in the valve body. To reduce the possibility of extruding or blowing the sealing member from its containing groove, valve seats have been developed which include a bleed orifice formed in the seat member to communicate the outer periphery of the O-ring retaining groove with the valve body. Therefore, under high line pressure conditions the elastomer O-ring sealing member is sucked or forced to expand radially outwardly and the outer annular lip forces the sealing member to break sealing engagement with the working surface of the gate member. If the pressure in the valve body is higher than the line pressure the sealing member will be forced by the pressurized lading to contract and move radially inwardly toward the bore of the valve and will break sealing engagement with the valve member. A disadvantage in the use of vented seat assemblies to retain O-ring type elastomer sealing members is the great deal of radial movement traversed by each of the O-ring sealing members under varying conditions of pressure within the valve itself. Since the elastomer sealing members are repeatedly stretched and compressed, as the pressure changes within the valve, wear on the sealing member will be accelerated and the sealing members must accordingly be frequently replaced.

Accordingly it is a primary object of this invention to provide a novel valve which employs seat units which define non-vented grooves and which grooves retain a sealing member formed of elastomer material.

An additional object of this invention includes the provision of a novel valve having contained elastomer type seat units wherein the sealing member will not be sheared or damaged upon gate movement.

It is among the objects of this invention to provide a novel valve construction which will provide a proper seal regardless of the direction of line flow.

It is a further object of this invention to provide a novel valve having seat members which are activated by the lading under line pressure to provide a simultaneous upstream seal and a downstream seal.

It is an even further object of this invention to provide a novel valve employing contained elastomer sealing elements wherein excessive valve chamber pressure will be vented into the upstream line.

It is a still further object of this invention to provide a novel valve employing contained elastomer sealing elements wherein the valve chamber may be bled with the valve in operation to indicate leakage of the lading past either of the seat means.

Other and further objects of this invention will be obvious upon an understanding of the illustrative embodiments about to be described, or will be indicated in the appended claims, and various advantages not referred to herein will occur to one skilled in the art upon employment of the invention in practice.

Briefly, the invention is directed to a valve having seat assemblies which include contained elastomeric sealing members which are positively locked within the seat rings and which provide adequate upstream and downstream seals at both low and high pressure ranges.

A preferred embodiment of the invention has been chosen for purpose of illustration and description and is shown in the accompanying drawings, forming a part of the specification, wherein;

FIGURE 2 is a partial elevational view in section illustrating a seat assembly of the valve of FIGURE 1 in detail.

FIGURE 3 is an elevational view of a sealing member in its unrestrained condition.

Figure 1:
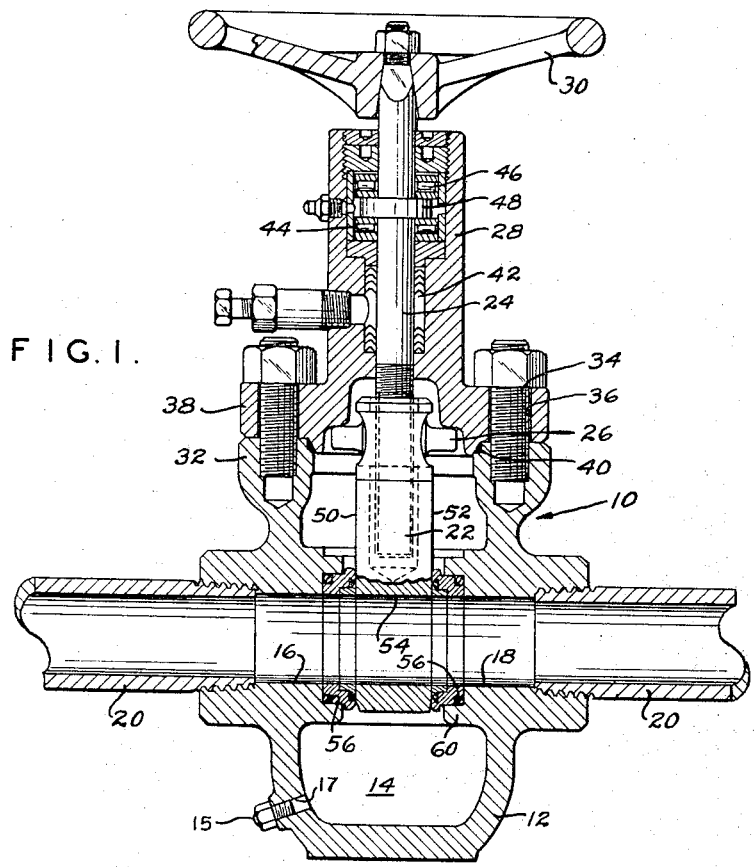
FIGURE 1 is an elevational view in section illustrating a valve in accordance with the invention.

Referring now to the drawings for a better understanding of this invention, a valve 10 is illustrated in FIGURE 1, which comprises a valve body 12, formed with a valve chamber 14 and having flow passages 16 and 18 in communication with the valve chamber 14. The flow passages may be internally threaded as illustrated for threadedly connecting the valve 10 to an externally threaded pipeline 20 or the valve body may be connected to a pipe system by other well-known connection structure such as bolted flange connection or welded connection, for example, without departing from the spirit or scope of this invention. A bleed fitting 15 is threaded into a threaded bore 17 in the valve body 12 and serves to vent the valve chamber 14 to the atmosphere when so desired.

A gate member 22 is positioned within the valve chamber 14 and is movable between opened and closed positions relative to the flow passages 16 and 18. The gate member 22 is of the flat or slab type having parallel planar sealing surfaces 50 and 52 formed thereon and includes a solid portion for blocking the flow passages 16 and 18 respectively. A port 54 formed in the gate 22 is adapted, in the open position of the gate, to register with the flow passages 16 and 18 to allow fluid to flow through the valve 10. A stem having external threads formed thereon is threadedly received at one end thereof by an internally threaded drive nut 26 which is retained at one end of the gate 22 whereby rotary movement of the stem 24 imparts vertical reciprocation to the gate 22. The stem 24 extends through a bonnet assembly 28. A valve operating means such as the handwheel 30 is nonrotatably fixed to the outer extremity of the stem 24 for manual rotation thereof to effect reciprocation of the gate member 22. The specific gate operator structure illustrated in FIGURE 1 and described above is intended as merely illustrative rather than limiting with respect to this invention. Various well-known electric, mechanical or hydraulic systems for effecting gate reciprocation may be employed with this invention without departing from the spirit or the scope thereof. The bonnet assembly 28 is removably fixed to an annular flange portion 32 of the valve body 12 by a series of studs 34 which extend through a series of openings 36 formed in an annular bonnet flange 38 to form a closure for the valve chamber 14. An annular sealing member 40 is disposed between the bonnet and the valve body to establish a fluid-tight seal.

A stem packing assembly 42 is positioned within a packing chamber formed in the bonnet 28 and about the stem 24 to establish a fluid-tight seal between the stem and the bonnet to prevent leakage of lading from the valve chamber 14 along the stem 24. A lower thrust bearing 44 and an upper thrust bearing 46 are positioned on opposite sides of an enlarged flange 48 formed integral with the stem 24 to prevent vertical stem movement during opening or closing of the valve.

A pair of opposing seat recesses 56 are formed respectively in opposed annular bosses 60 which are formed concentric with the associated flow passage and which extend into the valve chamber 14.

In accordance with a feature of this invention, a pair of identical opposed valve seat assemblies 64 are loosely positioned for reciprocal movement within the respective seat recesses 56. As illustrated in detail in FIGURE 2, each of the seat assemblies comprises a relatively rigid annular seat ring 68 having an exterior annular surface 70 thereof loosely fitting the annular recess wall 72 of the seat recess 56. An annular shoulder 74 and an annular rim 76 are formed on each of the seat rings 68 and coact with the axial recess wall 72 and the radial wall 78 of the respective seat recess 56 to define an annular chamber for retaining an annular O-ring type elastomeric sealing member 80. The cross sectional diameter of the O-ring 80 is greater than the axial dimension of the rim 78 and greater than the radial dimension of the shoulder 74, whereby the sealing ring 80 will extend axially and radially beyond the seat ring 68 and into intimate sealing contact with the axial and radial walls of the seat recess. An annular back face 82 of the seat ring 68 is disposed parallel with the axial wall 78 and is adapted to contact the axial wall 78 to transmit the load of the gate member 22 to the valve body. An annular sealing surface 84 is formed on each of the seat rings 68 and is adapted under pressure conditions to contact the sealing surface 50 of the gate member 22 to establish a metal to metal fluid-tight seal. An annular lip 86 is formed integral with the seat ring 68 and extends radially inwardly from the seat ring and has its inner circumference defined by a cylindrical surface 87. An annular retainer ring 90 having an interior annular surface 92 defining a portion of the flow passage of the valve is generally press-fitted within the seat ring 68 and has an annular lip 94 formed thereon extending radially outwardly which cooperates with the seat ring 68 to define an annular groove 96. A cylindrical surface 95 defines the outer circumference of the annular lip 94 and opposes the cylindrical surface 87. A planar face sealing surface 97 is formed on the retainer ring 90 and is positioned in coplanar relationship with the planar surface 84. The sealing surfaces 97 and 84 are surface ground in assembly so that they will cooperate to evenly distribute the gate load throughout the seat assembly as well as achieving metal to metal seals with the working surface of the gate at high line pressures. A generally planar surface 88 on the seat ring 68 forms the bottom wall of the annular groove 96.

An annular sealing ring 98 which is formed of elastomeric material is positioned within the groove 96 and has an annular sealing portion 100 thereof exposed for engagement with the working surface 50 of the gate member 22 to establish a fluid-tight seal between the seat and gate. As illustrated in FIGURE 3, the annular sealing member 98 is formed with a generally planar surface 102 which when assembled within the groove 96 engages the planar support surface 88 of the seat ring 68. An inner circumferential surface 104 and an outer circumferential surface 106 are disposed substantially normal to the surface 102 of the sealing member when the sealing member is assembled within the annular groove 96 are in spaced relation with the inner and outer circumferential surface of the groove. An inner generally conical surface 108 and an outer conical surface 110 on the sealing member 98 are engaged respectively by an inner conical surface 112 and an outer conical surface 114 formed respectively on the inner and outer lip portions 94 and 86 of the retainer ring 90 and the seat ring 68.

The axial dimension of the sealing ring 98 is slightly larger than the axial depth of the groove 96, whereby the sealing ring 98 is maintained under compression by the lips 112 and 114, thus causing the surfaces 104 and 106 on the sealing ring 98 to bulge slightly as illustrated in FIGURE 2. The rounded annular sealing surface 100 of the sealing ring 98 extends outwardly beyond the planar sealing surface 84 on the seat ring 68 and is normally in sealing engagement with the respective sealing surface 50 or 52 of the gate 22. The radial dimension of the sealing ring 98 is slightly less than the radial dimension of the annular groove 96 whereby upon application of high line pressure the entire sealing ring 98 will be displaced within the annular groove 96. The radial dimension of the sealing ring 98 is such relative to the spacing between the lips 86 and 94 that the lips will adequately retain the sealing member 98 against its being forced from the groove 96 by pressurized lading. It has been found that the radial spacing between the cylindrical surfaces 87 and 95 of the seat ring and retainer ring respectively, should not be greater than one-third of the radial dimension of the sealing ring. This ratio is given as illustrative, however, and is not to be interpreted as limiting in regard to this invention.

Figure 4:
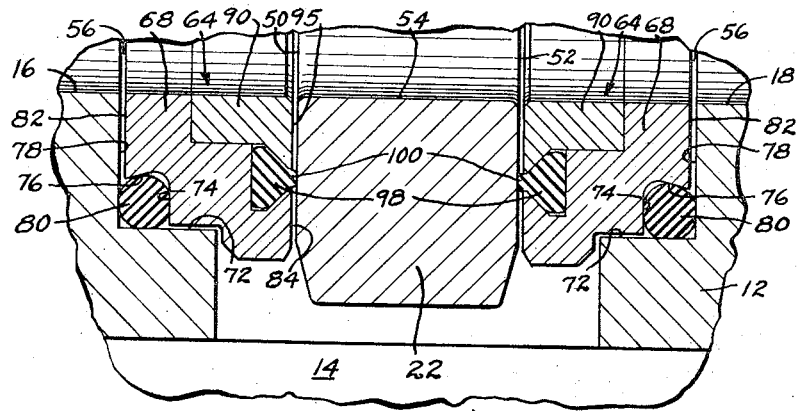
FIGURE 4 is a partial elevational view in section illustrating the position of the seat assembly elements of the valve of FIGURE 1 when the valve is in its open condition.

As illustrated in FIGURE 4, the seat assemblies 64 are in their balanced or unpressurized condition. The balanced condition will occur when the valve 10 is not under pressure or when the pressure within the valve chamber 14 and the flow passages 16 and 18 is equal. The gate member 22 may be either in its closed or open position. The upstream seat assembly left and the downstream seat assembly right will be forced by the O-ring back face sealing members 80 into light sealing engagement with the working surfaces 50 and 52 of the gate 22. The annular coplanar sealing surfaces 84 and 95 on the seat ring and retainer rings respectively, are slightly spaced from the working surfaces 50 and 52 of the gate 22 and the annular rounded sealing portion 100 of the seat ring 98 lightly engages the respective working surface 50 or 52 and establish a fluid-tight seal. Each of the O-rings 80 will lightly engage the rim 76 and the shoulder 74 of the seat ring 68 and the circumferential wall 72 and the radial wall 78 of the seat recess 56 to establish a fluid-tight seal between the seat ring 68 and the body 12. In the balanced condition, therefore, the sealing members and the O-ring back face sealing member will be maintained under light axial compression.

Figure 5:
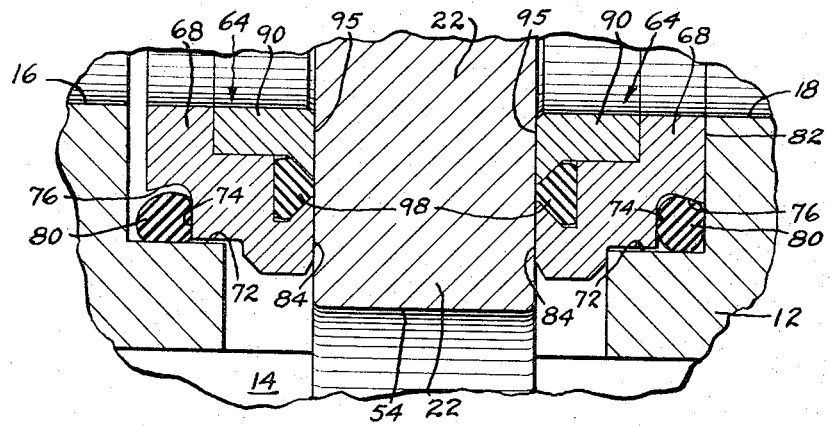
FIGURE 5 is a partial elevational view in section illustrating the position of the seat assembly elements of the valve of FIGURE 1 when the valve is closed and under pressure.

Assuming that the gate 22 of the valve 10 is in its closed position blocking the flow passages 16 and 18, as illustrated in FIGURE 5, both the upstream seat assembly left and the downstream seat assembly right will be actuated or moved downstream by the lading under line pressure into sealing engagement respectively with the working surfaces 50 and 52 of the gate 22. The force produced by the pressurized lading on the gate 22 will cause the gate to move downstream and to force the annular surface 82 of the seat ring 68 into abutment with the radial wall 78 of the recess 56. Since the annular sealing surfaces 84 and 95 on the seat assembly are surface ground in assembly, the gate load is evenly distributed through the retainer portion and seat portion of the seat assembly and transmitted to the surface 78 of the seat recess. The forces produced by the lading under pressure on the upstream sealing member will be greater at the back face portion of the seat assembly than at the face portion of the seat assembly causing the seat assembly to move downstream into sealing engagement with the working surface 50 of the gate member 22. The O-ring 80 of the upstream seat assembly left will be forced radially outwardly by the lading and will establish a fluid-tight sealing engagement with the circumferential wall 72 and the shoulder 78 of the seat ring 68. The upstream elastomeric sealing member 98 will be only slightly moved radially outwardly by the pressurized lading and will maintain tight sealing engagement with the working surface 50 of the gate 22. The downstream sealing ring 98 will be only slightly pressure actuated radially inwardly by the fluid pressure within the valve chamber 14 and it will also maintain fluid-tight sealing engagement with the working surface 52 of the gate 22. The downstream elastomer O-ring 80 (right) will be actuated by the pressurized lading within the valve chamber 14 in a radially inwardly direction and will establish a fluid-tight sealing engagement with the rim 76 of the seat ring 68 and with the annular surface 78 of the seat recess 56.

While the valve is operating under high line pressure conditions the planar sealing surfaces 84 and 95 of the seat assembly 64 will be in intimate sealing contact with the working surfaces 50 and 52 of the gate 22. At line pressures below the high pressure range the annular coplanar sealing surfaces 84 and 95 of the downstream seat assembly right will generally be engaged by the downstream working surface 52 of the gate 22 due to the amount of force produced by the lading on the gate 22. Under low pressure conditions the upstream seat assembly 64 will have sealing engagement with the working surface 50 of the gate 22 produced only by the sealing member 98 and the coplanar sealing surfaces 84 and 95 will be slightly spaced from the working surface 50 of the gate.

Figure 6:
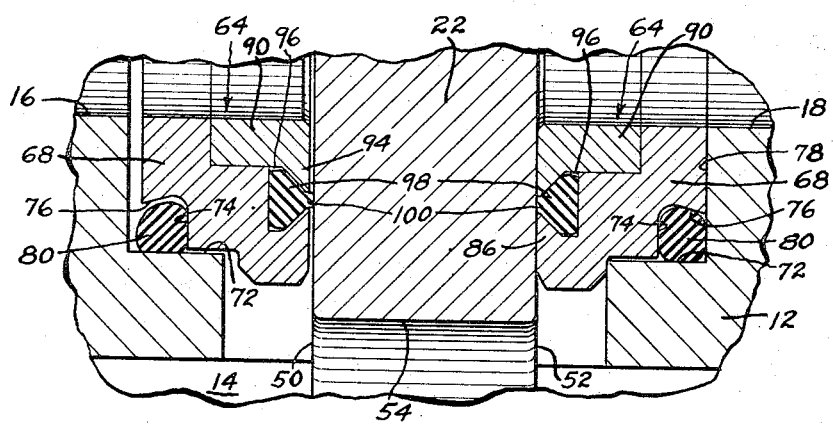
FIGURE 6 is a partial elevational view in section illustrating the position of the seat assembly elements of the valve of FIGURE 1 when the valve is closed and the valve chamber pressure is vented.

In accordance with a feature of this invention, the valve may be tested for leakage past either of the valve seat assemblies without disassembling the valve and without shutting down the line. With the gate 22 in its closed position as indicated in FIGURE 6, the valve chamber 14 is bled to atmospheric pressure by opening the bleed fitting 15, FIGURE 1. The pressurized lading will act on the gate 22 and force the downstream seat assembly 64 into engagement with the radial surface 78 of the seat recess 56. The downstream O-ring 80 will be thereby compressed both axially and radially to establish fluid-tight seals with the rim 76, the shoulder 74 of the seat ring 68, and with the radial wall 78 and the circumferential wall 72 of the seat recess 56 to prevent fluid from flowing from the downstream flow passage 18 between the seat assembly and the valve body. The downstream annular sealing ring 98 will be compressed into its respective groove 96 by the sealing surface 52 of the gate 22, and will establish a fluid-tight seal to prevent the flow of lading between the gate and the seat assembly into the valve body 14. The pressurized lading will produce a greater force at the back face portion than at the face portion of the seat assembly (left) and will cause the seat assembly 64 to move downstream into tight sealing engagement with the working surface 50 of the gate 22. The upstream annular sealing ring 98 will have its sealing surface 100 thereof in tight sealing engagement with the working surface 50 of the gate 22 to prevent the flow of lading between the gate and the sealing assembly 64. The upstream O-ring sealing member 80 will be pressure actuated in a radially outwardly direction and will establish tight sealing engagement with the annular shoulder 74 of the seat ring 68 and the circumferential surface 72 of the seat recess 56 to prevent the flow of fluid between the valve body and the upstream seat assembly 64 and into the valve chamber 14. Assuming that the face sealing members 98 and the O-rings 80 are in good condition and the working surfaces 50 and 52 of the gate 22 are smooth, the valve may be bled to atmospheric pressure and the seat assemblies will prevent further fluid from flowing into the valve chamber. If after the bleed fitting has been opened for a short time and the flow of fluid from the valve body continues, it is apparent that either the seat assemblies must be repaired or replaced. Repair of the valve in accordance with this invention is a simple matter and may be easily accomplished with the use of simple wrenches without removing the valve from the line. After the bonnet assembly and the gate have been removed from the valve, the seat assemblies are easily extracted without the use of tools. The retainer ring 90 is removed from the seat ring 68 and the worn sealing ring is then removed. After a new seat ring 98 has been installed into the groove and the retainer ring replaced, and after the O-ring 80 is replaced, the seat assemblies are ready for reinstallation into the seat recesses. The total cost of repairing the seat assemblies in this manner will be very small and the total time involved in dismantling, repairing and reassembling the valve will ordinarily take but a few minutes.

Figure 7:
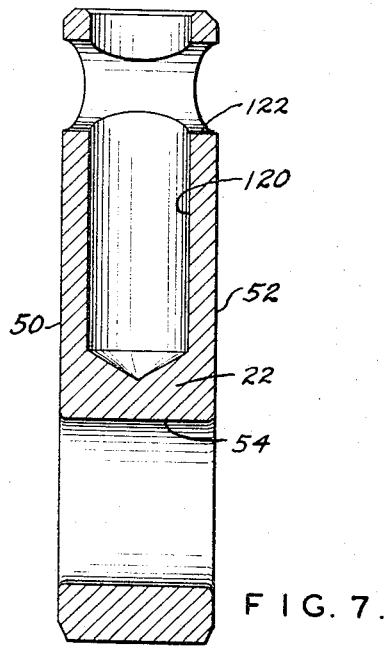
FIGURE 7 is an elevational view of the gate member of the valve of FIGURE 1.
Figure 8:
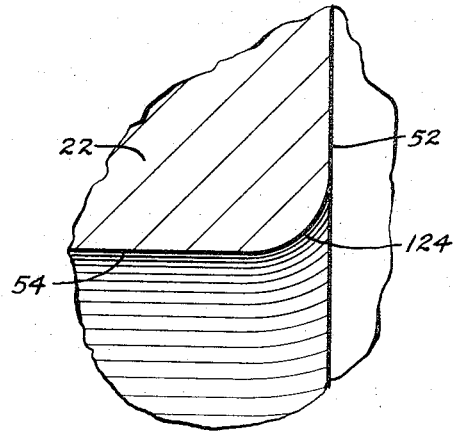
FIGURE 8 is a partial elevational view of the gate member of FIGURE 7, illustrating the intersection between the bore and the working surface in greater detail.
Figure 9:
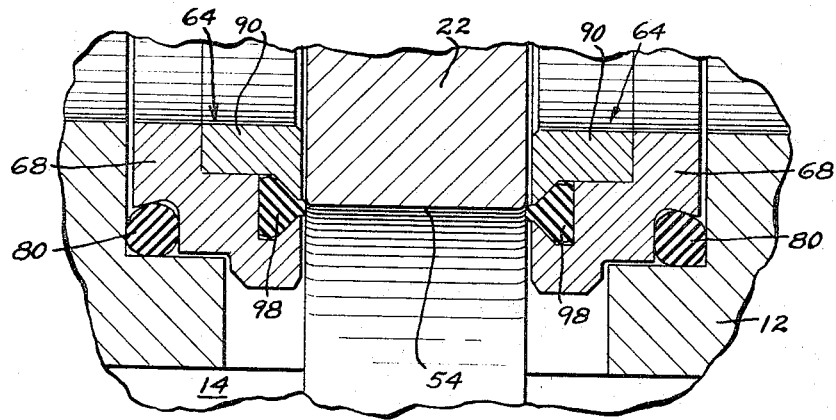
FIGURE 9 is a partial elevational view in section illustrating the position of the seat assembly elements of FIGURE 1 during the critical movement of the gate from the open position to the closed position.

In accordance with another feature of this invention, as illustrated in FIGURES 7 and 8 and 9, means are provided to prevent shearing of the sealing member 98 by the valve member as the valve member moves from its open position to its closed position. The gate member 22 is provided with a vertical bore 120 for receiving the lower portion of the stem 24. A transverse bore 122 is formed in the upper portion of the gate 22 and intersects the bore 120. The drive nut 26 is received in the transverse bore 122 as illustrated in FIGURE 1. An annular cam surface 124 is provided on either side of the gate 22 at the juncture of the port 54 with the sealing surfaces 50 and 52. The cam surface 124 serves to cam the sealing portion 100 of the annular sealing member 98 in a direction away from the gate 22 to prevent shearing of the sealing member 98. As illustrated in FIGURE 9, a critical condition exists as the upper curved surface of the port 54 moves past the annular portion of the sealing ring 98. Fluid under pressure flowing past the upper sealing ring 98 and through the port 54 and past the lower sealing ring 98 and into the downstream line follows a tortuous path, thus inducing a turbulent condition to exist which tends to suck or extrude the sealing member 98 into the path of the gate where the sealing member may be damaged or sheared by the gate. Since the annular lips 86 and 94 define a restriction at the outer portion of the groove 96, which generally is not greater than one-third the radial dimension of the sealing ring 98, the sealing ring will be effectively prevented from extending outwardly of the groove an excessive amount. Since the sealing ring 98 is normally under compression within the groove 96 and because of the structural stability inherent in the shape of the sealing ring 98, the turbulence of the fluid will be unable to force the sealing ring 98 from its groove. Under extremely high pressure conditions, however, a small portion of each of the sealing rings will be forced to extend slightly into the path of the gate, as illustrated in FIGURE 9. As the port 54 of the gate moves past the sealing ring 98 the annular cam surface 124 will engage the annular sealing surface 100 and will move the sealing surface 100 in a direction away from the gate member rather than severing or shearing the sealing ring.

Figure 10:
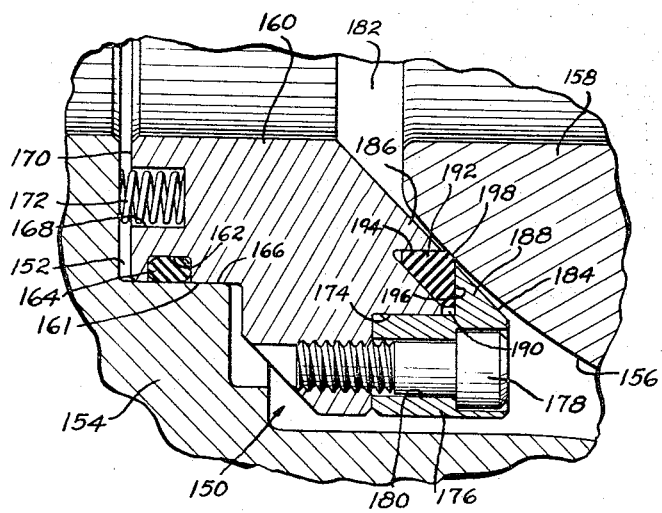
FIGURE 10 is a partial elevational view in section illustrating a modified form of the invention.

As illustrated in FIGURE 10, a modified form of the invention for use with a trunnioned ball valve includes the provision of a generally triangular elastomeric sealing ring which is retained in a groove formed in each of the seat assemblies. Seat assemblies 150 are fitted within opposing seat recesses 152 formed in the valve body 154 of a trunnioned spherical plug valve and are disposed for sealing engagement with the working surface 156 of a trunnioned spherical plug or ball 158. A seat ring 160 is formed with a generally cylindrical surface 161 which is loosely received within the seat recess 152 and adapts the seat 160 for sliding movement within the seat recess. The annular surface 161 has an annular back seal groove 162 formed therein which retains an O-ring 164 therein under compression to establish a fluid-tight seal between the seat ring 160 and a circumferential wall 166 defining the circumference of the seat recess 152. A series of bores 168, formed in an annular back face surface 170 of the seat ring 160, retain a series of compression springs 172 which serve to force the seat assembly 150 into contact with the spherical plug 158. The seat ring 160 is formed with an annular surface 174 about which is received an annular retainer ring 176. The retainer ring 176 is fixed to the seat ring 160 by a series of bolts 178 which extend through a series of bores 180 in the retainer ring and are threadedly received in the seat ring. The seat ring 160 is formed with a generally conical surface 182 which is substantially coextensive with a conical surface 184 formed on the retainer ring 176. The seat ring 160 is undercut to define an annular lip 186 which is spaced from and which cooperates with an annular lip 188 formed on the retainer ring 176 to define a generally triangular groove 190. An annular elastomeric sealing member 192 having a cross sectional dimension slightly smaller than the cross sectional dimension of the groove 190 is disposed within the groove 190. An inner circumferential substantially cylindrical surface 194 and a substantially planar radial surface 196 on the sealing ring 192 are engaged respectively by the lips 186 and 188 so that the sealing ring is maintained under compression when in assembly. An annular curved sealing surface 198 on the sealing ring 192 is formed at the juncture of the surfaces 194 and 196 and extends through the annular space between the lips 186 and 188 into intimate sealing engagement with the spherical working surface 156 of the plug 158.

The back face surface area in contact with the lading is greater than the face surface area thus resulting in a greater force at the back face than at the face portion of the seat assembly. This force differential causes both the upstream and downstream seat assemblies 150 to be moved or pressure actuated into sealing engagement with the plug.

The base portion of the generally triangular groove 88 is greater in dimension than the base of the sealing ring 192 thus forming a small annular space on each side of the sealing ring. As line pressures increase to a high level the curved portion 198 of the sealing ring will be forced entirely within the groove 190 by the working surface 156 of the plug 158 and the elastomeric material, from which the sealing ring is composed, will flow into the spaces at the base of the groove. Displacement of the sealing member entirely within the groove effectively prevents shearing of the sealing member upon rotation of the spherical plug.

From the foregoing, it will be seen that the invention is one well adapted to attain all of the objects hereinabove set forth, together with other advantages which are obvious and inherent from the description of the apparatus itself.

It will be understood that certain features and subcombinations are of utility and may be employed without reference to other features and subcombinations. This is contemplated by and is within the scope of the claims. As many possible embodiments may be made of the invention without departing from the spirit or the scope thereof, it is to be understood that all matter herein set forth or shown in the accompanying drawings is to be interpreted as illustrative and not in a limiting sense.

I claim:

1. A valve comprising a valve chamber formed therein and flow passages in communication with the valve body, a valve member disposed within the valve chamber and movable between open and closed positions relative to the flow passages, means for imparting movement to the valve member, a pair of valve seat assemblies positioned one on either side of the valve member and sealingly engaging the valve member, means defining an annular groove having radially opposed frusto-conical support surfaces and a generally planar bottom surface in each of the seat assemblies, an annular resilient sealing ring positioned in each of said grooves, each of said sealing rings having a generally planar annular base surface for engagement with said bottom surface and cylindrical radial surfaces defining the inner and outer periphery thereof, annular frusto-conical radially opposed support surfaces formed on each of the sealing rings and being engaged by said frusto-conical support surfaces to retain said sealing rings under compression within the respective grooves, an annular sealing surface of each of said sealing rings extending axially beyond said seat assembly and being in sealing engagement with said valve member, each of said sealing rings in its uncompressed state having a greater axial length than the axial length of its associated groove and a lesser radial width than the radial width of the associated groove.

2. A sealing ring for a valve having a movable valve member, said sealing ring being formed of elastomeric material and having an annular planar base surface, annular cylindrical surfaces defining the inner and outer circumference of the sealing ring and being disposed substantially normal to said base surface, a pair of radially opposed frusto-conical support surfaces formed on the sealing ring remote from said base surface, the support surfaces being connected by an annular curved sealing surface.

3. A sealing ring for a valve having a movable valve member, said sealing ring being formed of elastomeric material and having an annular planar base surface, annular opposed coaxial cylindrical surfaces defining the inner and outer circumference of the sealing ring and being disposed substantially normal to said base surface, a pair of radially opposed frusto-conical coaxial support surfaces formed on the sealing ring remote from said base surface, the support surfaces being connected by an annular curved sealing surface.

4. A seat assembly for a gate valve having a valve body formed with a valve chamber and flow passages in communication with the valve chamber, a pair of opposed seat recesses formed in the valve body within the valve chamber and being in coaxial relation with the flow passages, a gate member having a port formed therein and having planar parallel working surfaces thereon being disposed within the valve chamber for movement between open and closed positions relative to the flow passages, a seat ring being disposed for axial movement in each of the seat recesses, each of the seat rings having an annular rim and an annular shoulder defining annular chambers with the walls of the respective seat recesses, a resilient O-ring being disposed in each annular chamber and being under axial and radial compression for establishing a seal between the valve body and the seat ring, a generally planar annular surface formed on the seat ring and disposed adjacent the working surface of the gate and adapted for contact therewith, an annular retainer ring press-fitted within the seat ring and cooperating with the seat ring to define a groove having a planar bottom surface and cylindrical side surfaces, a first annular lip formed on the seat ring and defining a first frusto-conical surface, a second annular lip formed on the retainer ring and forming a second frusto-conical surface, the first and second lips being radially spaced to define an annular constricted opening at the outer extremity of the groove, an annular sealing ring disposed within the groove and having an annular planar surface said sealing ring having an axial dimension greater than the axial dimension of the groove, thereof in intimate contact with said bottom surface, cylindrical side surfaces formed on the sealing ring and being spaced from the side surfaces of the groove, opposed frusto-conical surfaces formed on the sealing ring remotely from the planar surface and being engaged by the frusto-conical surfaces on said lips whereby the sealing ring is maintained under axial compression, an annular portion of the sealing ring extending through said restricted opening and into sealing engagement with the working surface of the gate member.

5. A seat assembly for a valve having a valve body formed with a valve chamber and flow passages communicating with the valve chamber, a valve member movably disposed within the valve chamber for opening and closing the the valve, said seat assembly comprising: a seat ring movably disposed within the valve chamber, means establishing a fluid-tight seal between the valve body and the seat ring and urging the seat ring toward the valve member, a planar sealing surface formed on the seat ring and adapted for sealing engagement with the valve member, an internal annular lip formed on said seat ring, an annular retainer ring being fitted within the seat ring and defining with the seat ring an annular groove, an annular generally planar surface on the seat ring defining the bottom wall of the groove, an external lip formed on the retainer ring and cooperating with said internal lip to form a restricted opening at the outer extremity of said groove, an annular planar sealing surface formed on the retainer ring and disposed coplanar with the sealing surface of the seat ring, an annular sealing ring disposed within said groove and having an annular generally planar base surface in intimate contact with the bottom wall of the groove, said sealing ring having opposed frusto-conical surfaces thereon in intimate contact with said internal and external lips, said sealing ring being greater in axial dimension than the axial dimension of the groove whereby the sealing ring will be maintained under axial compression and annular portion of said sealing ring extending from said annular groove for sealing engagement with said valve member of said valve.

6. A seat assembly for a valve having a valve body formed with a valve chamber and flow passages communicating with the valve chamber, a valve member movably disposed within the valve chamber for opening and closing the valve, said seat assembly comprising: a seat ring movably disposed within the valve chamber, means establishing a fluid-tight seal between the valve body and the seat ring and urging the seat ring toward the valve member, a planar sealing surface formed on the seat ring and adapted for sealing engagement with the valve member, an internal annular lip formed on said seat ring, an annular retainer ring being press-fitted within the seat ring and defining with the seat ring an annular groove, an annular generally planar surface on the seat ring defining the bottom wall of the groove, an external lip formed on the retainer ring and cooperating with said internal lip to form a restricted opening at the outer extremity of said groove, an annular planar sealing surface formed on the retainer ring and disposed coplanar with the sealing surface of the seat ring, an annular sealing ring disposed within said groove and having an annular generally planar base surface in intimate contact with the bottom wall of the groove, said sealing ring having opposed frusto-conical surfaces thereon in intimate contact with said internal and external lips, said sealing ring being greater in axial dimension than the axial dimension of the groove and lesser in radial dimension than the radial dimension of the groove whereby the sealing ring will be maintained under axial compression, an annular portion of the sealing ring extending through said restricted opening and being in sealing engagement with the valve member.

7. A seat assembly for a valve having a valve body formed with a valve chamber and flow passages communicating with the valve chamber, a valve member movably disposed within the valve chamber for opening and closing the valve and having a working surface, said seat assembly comprising: a seat ring movably disposed within the valve chamber, means establishing a fluid-tight seal between the valve body and the seat ring and urging the seat ring toward the valve member, a generally conical sealing surface formed on the seat ring and adapted for sealing engagement with the valve member, an annular lip formed on said seat ring, an annular retainer ring being fitted about the seat ring and defining with the seat ring an annular groove, an annular lip formed on the retainer ring and cooperating with said seat ring lip to form a restricted opening at the outer extremity of said groove, a generally conical sealing surface formed on the retainer ring and disposed coextensive with the sealing surface of the seat ring, said annular groove having a frusto-conical base surface disposed in generally concentric relation with said working surface of said valve member and having a cylindrical surface and a generally planar annular surface intersecting said generally conical surface and defining said annular lips thereby defining a generally triangular cross sectional groove configuration, an annular sealing ring disposed within said groove and having a frusto-conical base surface in intimate engagement with the frusto-conical base surface of said groove and having a cylindrical surface and generally planar surface engaging respectively said cylindrical surface and generally planar surface of said annular lips, said sealing ring being of greater axial length than the corresponding axial length of said groove thereby causing said annular lips to maintain said sealing member under axial compression, said sealing ring being smaller in radial cross section than the corresponding radial cross section of said groove thereby defining radial spaces on at least one side of said sealing ring, an annular portion of said sealing ring extending through said restricted opening and sealingly engaging said working surface of said valve member.

8. A sealing ring for a spherical plug valve having a movable valve member, said sealing ring being formed of elastomeric material and having a generally frusto-conical base surface, cylindrical surfaces defining the inner and outer circumference of the sealing ring and being disposed in generally transverse relation with said base surface, a radial surface disposed generally normal to the cylindrical surfaces, inner circumferential surfaces and the radial surface being connected by an annular curved sealing surface.

References Cited
UNITED STATES PATENTS

| | | | |
|---|---|---|---|
| 2,870,987 | 1/1959 | Greenwood | 251—328 X |
| 2,916,254 | 12/1959 | Wendell | 251—172 |
| 3,067,978 | 12/1962 | Natho | 251—172 |
| 3,109,623 | 11/1963 | Bryant | 251—172 |

WILLIAM F. O'DEA, *Primary Examiner.*

HAROLD WEAKLEY, *Examiner.*